(12) United States Patent
Diaconu et al.

(10) Patent No.: US 10,802,926 B2
(45) Date of Patent: Oct. 13, 2020

(54) ACCESSING PRIOR STORAGE SEGMENT SERVER STATE

(71) Applicant: Microsoft Technology Licensing, LLC, Redmond, WA (US)

(72) Inventors: Cristian Diaconu, Kirkland, WA (US); Huanhui Hu, Redmond, WA (US); Sheetal Shrotri, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 133 days.

(21) Appl. No.: 16/138,683

(22) Filed: Sep. 21, 2018

(65) Prior Publication Data

US 2020/0097366 A1 Mar. 26, 2020

(51) Int. Cl.
G06F 11/00 (2006.01)
G06F 11/14 (2006.01)
H04L 29/08 (2006.01)

(52) U.S. Cl.
CPC ...... *G06F 11/1451* (2013.01); *G06F 11/1464* (2013.01); *G06F 11/1471* (2013.01); *H04L 67/1097* (2013.01); *G06F 2201/84* (2013.01)

(58) Field of Classification Search
CPC ............ G06F 11/1451; G06F 11/1464; G06F 11/1471; G06F 11/14; G06F 11/1402; G06F 11/1407; G06F 11/1446; G06F 11/1448; G06F 11/1458; G06F 11/1466; G06F 11/1469; G06F 2201/84; G06F 16/10; G06F 16/11; G06F 16/113; G06F 16/128; G06F 16/20; G06F 16/21; H04L 67/1097; H04L 67/10
See application file for complete search history.

(56) References Cited

U.S. PATENT DOCUMENTS

| | | | |
|---|---|---|---|
| 7,627,728 B1 | 12/2009 | Roeck et al. | |
| 7,707,184 B1 | 4/2010 | Zhang et al. | |
| 8,856,619 B1 | 10/2014 | Cypher | |
| 9,218,244 B1 | 12/2015 | Hayes et al. | |
| 9,514,007 B2 | 12/2016 | Gupta et al. | |
| 9,558,078 B2* | 1/2017 | Farlee | G06F 11/1471 |
| 10,229,011 B2* | 3/2019 | Leshinsky | G06F 3/0619 |
| 2014/0279907 A1 | 9/2014 | Koza et al. | |

(Continued)

OTHER PUBLICATIONS

Prakash, Ravi, and Mukesh Singhal. "Low-cost checkpointing and failure recovery in mobile computing systems." IEEE Transactions on Parallel and Distributed Systems 7, No. 10 (1996): 1035-1048. (Year: 1996).*

(Continued)

*Primary Examiner* — Anthony J Amoroso
(74) *Attorney, Agent, or Firm* — Workman Nydegger

(57) ABSTRACT

Assembly of a state of user data as of a particular point in time in the context of the data being spread across multiple storage segment servers. Furthermore, the assembly occurs despite the storage segment servers not needing to coordinate a timing of any snapshots. Rather, the storage segment servers perform a snapshot of the portion of the data that it individually stores without having to coordinate with any other storage segment server. The particular point of time may be any arbitrary time, such as a time selected by a user.

20 Claims, 9 Drawing Sheets

(56) References Cited

U.S. PATENT DOCUMENTS

2017/0235745 A1* 8/2017 Hoobler, III .......... G06F 16/128
                                                          707/639
2018/0088816 A1    3/2018 Chiu et al.
2018/0173562 A1    6/2018 Chen et al.

OTHER PUBLICATIONS

Weiler, Beatrice, and Edgar Nett. "Speed Log: A Generic Log Service Supporting Efficient Node-Crash Recovery." IEEE Micro 5 (1994): 60-71. (Year: 1994).*

"NetApp Snapshot", Retrieved from: https://web.archive.org/web/20121220083537/https:/www.netapp.com/us/products/platform-os/snapshot.aspx, Dec. 20, 2012, 2 Pages.

Horn, Christian, "How can process snapshot/restore help save your day?", Retrieved from: https://www.redhat.com/en/blog/how-can-process-snapshotrestore-help-save-your-day?source=bloglisting&page=28, Jul. 19, 2017, 6 Pages.

"International Search Report and Written Opinion Issued in PCT Application No. PCT/US2019/039094", dated Oct. 8, 2019, 11 Pages. (MS# 405082-WO-PCT).

* cited by examiner

ACCESSING PRIOR STORAGE SEGMENT SERVER STATE

BACKGROUND

A variety of services are now offered in a cloud computing environment. "Cloud computing" is a model for enabling ubiquitous, on-demand network access to a shared pool of configurable computing resources (e.g., networks, servers, storage, applications, and services). A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. One type of software as a service ("SaaS") is known as database as a service (DBaaS).

Conventional DBaaS is typically implemented within an architecture that includes one primary compute node and one or more secondary compute nodes (each node often provided as a virtual machine). The primary compute node operates a database server and has a directly attached solid state drive that the primary database server may read from and write to. Secondary compute nodes also operate the database server and also have a solid-state drive that the respective secondary database server may read from and write to. The data on the primary compute node is synchronized with the secondary compute nodes.

The secondary compute nodes provide redundancy with the aim of meeting service availability objectives. If the primary compute node was to fail, failover of the database may occur by promoting one of the secondary compute nodes to the primary compute node and instantiating an additional secondary compute node to maintain the desired level of redundancy.

In order to synchronize the data at the primary compute node with the data at the secondary compute nodes, communication is required from the primary compute node to the secondary compute nodes. The primary compute node keeps a log of operations that occur at the primary compute node. The primary compute node may send the log records (either individually or as a block) to the secondary computing nodes. The secondary compute nodes each apply the operations specified by the primary compute node and acknowledges such back to the primary compute node. Once the primary compute node receives such an acknowledgement back from a quorum (say two out of three secondary compute nodes), the primary compute node has synchronized its data with the secondary compute nodes to a degree that if the primary compute node goes down, there is a guaranty that a majority of the secondary compute systems will have the log record applied. Thus, in case of recovery, even if the newly elevated primary compute node had not yet applied the log record, that newly elevated primary compute node may still update itself with the current data by consulting with the other secondary compute nodes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to assembly of a state of user data as of a particular point in time in the context of the data being spread across multiple storage segment servers. Furthermore, the assembly occurs despite the storage segment servers not needing to coordinate a timing of any snapshots. Rather, the storage segment servers perform a snapshot of the portion of the data that it individually stores without having to coordinate with any other storage segment server. The particular point of time may be any arbitrary time, such as a time selected by a user.

For each storage segment server, an additional instance of the storage segment server is instantiated. That additional instance is caused to assume an initial state that the respective storage segment server had at or prior to the last snapshot performed by that respective storage segment server. That initial time may be at or prior to any transactions that were pending at the time of that last snapshot. Perhaps the initial time may be at or prior to any transactions that were so pending, and which impacted the portion of the data stored by the respective storage segment server. Each of the additional instances then reapplies logged records beginning at that initial state and continuing through to the particular point in time, to thereby arrive at a state of the portion of the data as of the particular point in time. Each portion may potentially be assembled into all or a subset of the larger set of user data, to thereby obtain the user data as it existed at that particular point in time.

Thus, the principles described herein allow for obtaining a state of user data as it existed at different instances of time that are selectable by a user, and that are not confined to times of snapshots. Furthermore, this is possible even though the data is distributed across multiple servers that need not coordinate the time of the snapshot. This allows the snapshot logic employed at each storage segment server to be simplified since no communication is required with other storage segment servers. Furthermore, the snapshot process is more resilient since the snapshot at one storage segment server does not depend on whether another storage segment server is operating properly, or even functioning at all.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

At least some embodiments described herein relate to assembly of a state of user data as of a particular point in time in the context of the data being spread across multiple storage segment servers. Furthermore, the assembly occurs despite the storage segment servers not needing to coordinate a timing of any snapshots. Rather, the storage segment servers perform a snapshot of the portion of the data that it individually stores without having to coordinate with any other storage segment server. The particular point of time may be any arbitrary time, such as a time selected by a user.

For each storage segment server, an additional instance of the storage segment server is instantiated. That additional instance is caused to assume an initial state that the respective storage segment server had at or prior to the last snapshot performed by that respective storage segment server. That initial time may be at or prior to any transactions that were pending at the time of that last snapshot. Perhaps the initial time may be at or prior to any transactions that were so pending, and which impacted the portion of the data stored by the respective storage segment server. Each of the additional instances then reapplies logged records beginning at that initial state and continuing through to the particular point in time, to thereby arrive at a state of the portion of the data as of the particular point in time. Each portion may potentially be assembled into all or a subset of the larger set of user data, to thereby obtain the user data as it existed at that particular point in time.

Thus, the principles described herein allow for obtaining a state of user data as it existed at different instances of time that are selectable by a user, and that are not confined to times of snapshots. Furthermore, this is possible even though the data is distributed across multiple servers that need not coordinate the time of the snapshot. This allows the snapshot logic employed at each storage segment server to be simplified since no communication is required with other storage segment servers. Furthermore, the snapshot process is more resilient since the snapshot at one storage segment server does not depend on whether another storage segment server is operating properly, or even functioning at all.

First, an example environment that includes a primary compute system, secondary compute system(s), and the storage segment server environment will be described with respect to FIGS. 1 through 5. Then, the accessing of a state of the user data distributed across storage segment servers will then be described with respect to FIGS. 6 through 9B. Then, because components described herein may operate by a computing system, a computing system will then be described with respect to FIG. 10.

Figure 1:
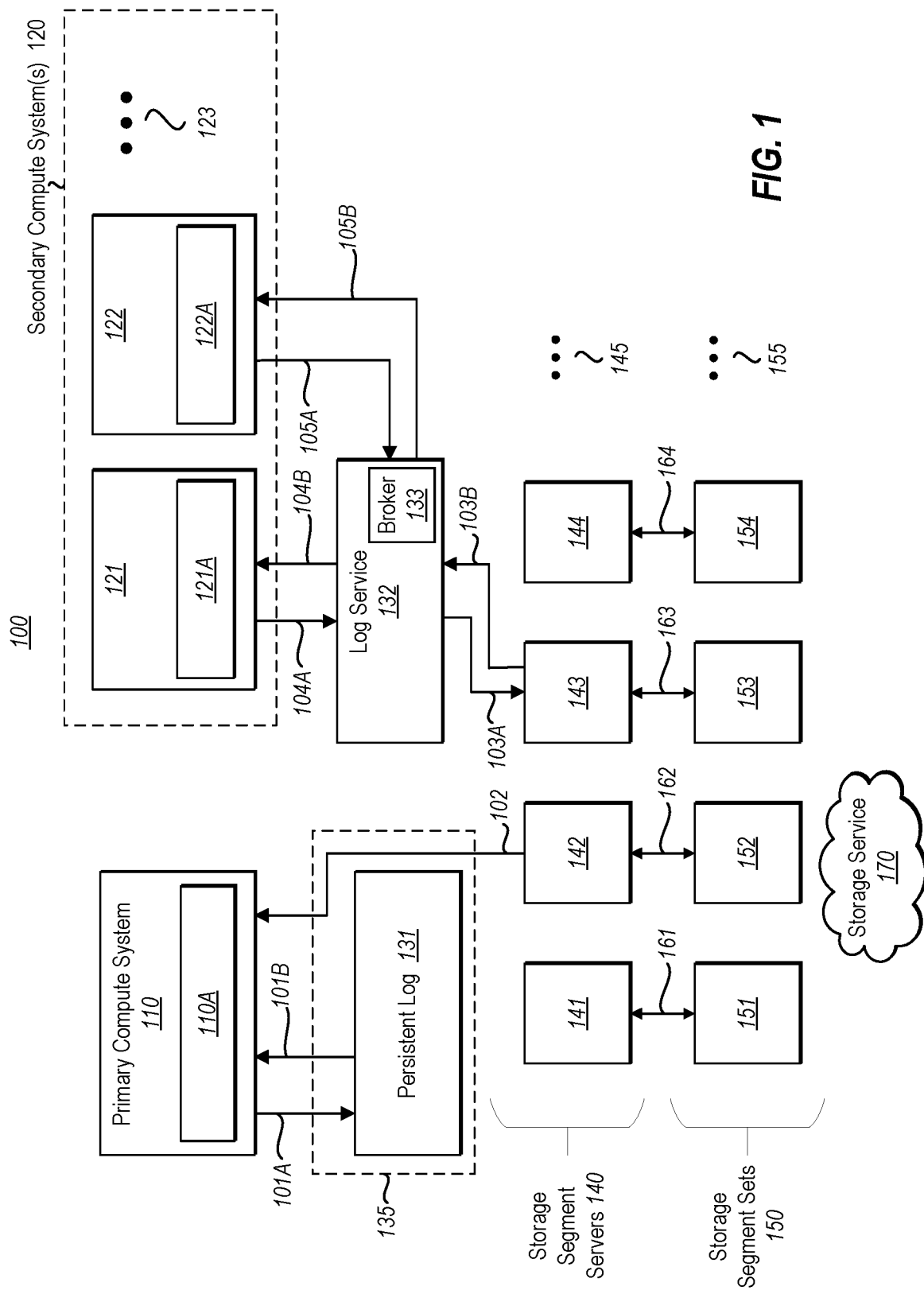
FIG. 1 illustrates an environment in which the principles described herein may be employed, which includes a primary compute system, one or more secondary compute systems, storage segment servers across which data is stored, a persistent log, and a log service for applying log records generated by the primary compute system.

FIG. 1 illustrates an environment 100 in which the principles described herein may be employed. As an example only, the environment 100 may be a network, such as perhaps a cloud computing environment. The environment 100 includes a primary compute system 110 that operates thereon an application 110A. As an example, the application 110A may be a database server application. The primary compute system 110 may be a physical computing system (such as a compute node in a cloud computing environment), in which case the primary compute system 110 may be structured as described below with respect to the computing system 1000 of FIG. 10. Alternatively, or in addition, the primary compute system 110 may be a virtual machine that emulates a computing system. The application 110A running on the primary compute system 110 performs write operations against user data. For instance, if the application 110A is a database server, the user data would be the database.

Although the principles described herein do not require it, the environment 100 also optionally includes secondary compute systems(s) 120. Each of the secondary compute system(s) 120 operates a corresponding application, which may be an instance of the very same application that is being run on the primary compute system 110. For instance, if the application 110A on the primary compute system 110 was a database server application, an instance of the database server application may be run on each of the secondary compute system(s) 120. The secondary compute system(s) 120 may each be a physical computing system (such as a compute node in a cloud computing environment), in which case the secondary compute system may be structured as described below with respect to the computing system 1000 of FIG. 10. Alternatively, or in addition, each secondary compute system(s) 120 may be a virtual machine that emulates a computing system.

The secondary compute system(s) 120 may include any number of secondary compute systems. In the illustrated embodiment, there are two secondary compute systems 121 and 122 illustrated, each operating a respective application 121A and 122A. The ellipsis 123 represents that the principles described herein are not limited to the number of secondary compute system(s) 120. For instance, there may be only one second computing system, or potentially an innumerable quantity of secondary compute system. Furthermore, since the second compute system(s) 120, there may even be zero secondary compute systems.

Should the primary compute system 110 fail such that recovery is not efficiently possible, one of the secondary compute system(s) 120, if there are any, would be promoted to be the new primary compute system, thus allowing that promoted compute system to perform write operations. Thus, the secondary compute system(s) 120 allows for there to be built-in redundancy within the environment 100. If a secondary compute system is promoted to be the primary compute system, a new secondary compute system may be started in order to replace the promoted compute system and thereby retain a desired number of secondary compute system(s) 120. That said, new secondary compute systems may be started and removed independent of whether there is a failure in the primary compute system 110.

When the primary compute system 110 performs write operations to user data (e.g., a database or database content), the primary compute system 110 logs (as represented by arrow 101A) those data operations into a persistent log 131. The persistent log 131 is kept so that the environment 100 may recover in case of a failure. The process of the primary compute system 110 writing to a storage segment (e.g., a page of user data), while persistently logging that write operation, will now be described.

Figure 2:
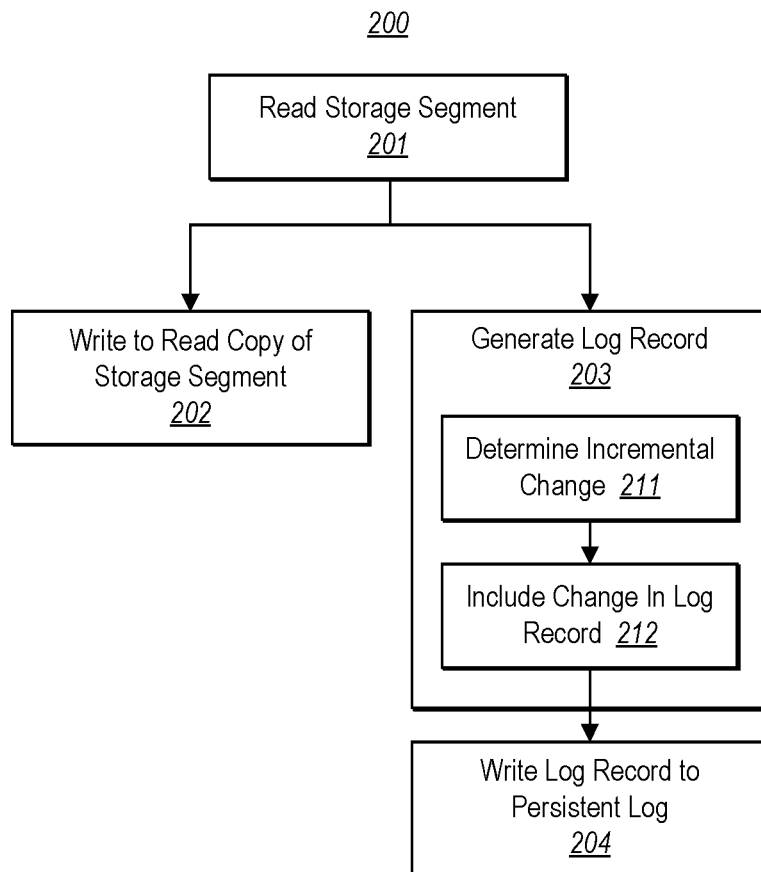
FIG. 2 illustrates a flowchart of a method for generating a log record and performing a write operation.

In particular, FIG. 2 illustrates a flowchart of a method 200 for generating a log record and performing a write operation. As an example, the method 200 may be performed by the primary compute system 110 of FIG. 1. The primary compute system 110 first reads a particular storage segment (act 201). This ensures that a copy of the storage segment is brought into the cache of the primary compute system. The storage segment may have been previously read by the primary compute system, in which case that storage segment will already be within the cache of the primary compute system. Otherwise, the primary compute system performs a read operation from the respective storage segment server that contains the storage segment that is to be written to. In FIG. 1, for instance, the primary compute system 110 reads (as represented by arrow 102) a storage segment (e.g., a page) from the storage segment server 142).

Figure 3:
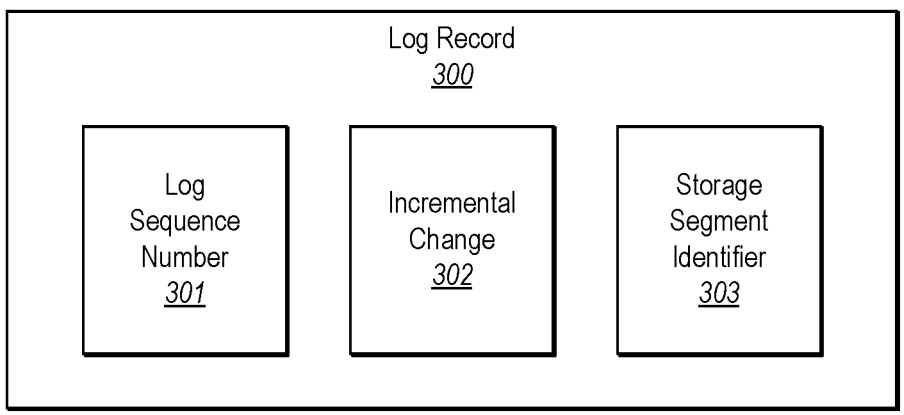
FIG. 3 illustrates a log record that includes a log sequence number, a description of the incremental change to a storage segment, as well as the storage segment identifier to which that change was applied.

The primary compute system then writes to the read (e.g., cached) copy of that storage segment (act 202). Also, to create a log record of that write operation (act 203), the incremental change made or to be made as part of that write operation is determined (act 211). The primary compute system then creates a log record that includes the incremental change (act 212). For instance, FIG. 3 illustrates a log record 300 that includes a log sequence number 301, description of the incremental change 302, as well as the storage segment identifier 303 to which that change was applied. A log sequence number is number that uniquely identifies a log record, and that represents a position of the log record within the log. The log sequence number is typically a monotonically increasing number such that the higher the log sequence number, the more recent the log record was placed within the log. The log record is written in a persistent log (act 204). For instance, in FIG. 1, as represented by arrow 101A, the primary compute system 110 writes the log record (e.g., log record 300) into the persistent log 131.

Figure 4:
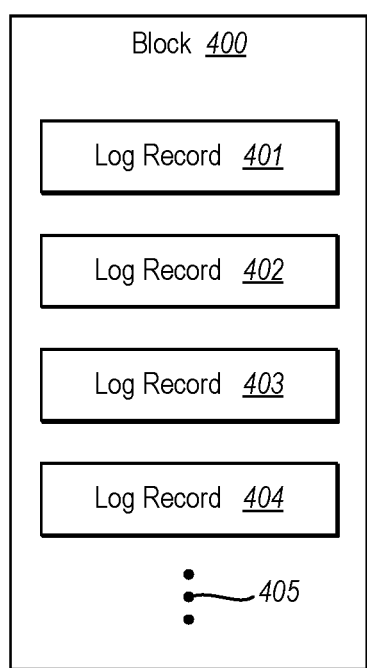
FIG. 4 illustrates a block populated with multiple log records.

In one embodiment, the log records are organized into blocks. A block is a unit of storage that may be written to and read from atomically (i.e., at one time—such that the write or read is either completed for the entire block, or not performed at all). A typical block size will be constant in a computing system, but example block sizes include 512 and 4096 bytes. Because a log record may be much smaller than a block, a block may include multiple log records. FIG. 4 illustrates a block 400 populated with multiple log records 401, 402, 403 and 404. As an example, the log record 300 of FIG. 3 might be the log record 402 of FIG. 4. The ellipsis 405 represents that the block 400 may include any number of blocks that are suitable given the size of a log record, and the size of the block. Each log record may be said to occupy a "slot" within the block. When writing the log record to the persistent log (as represented by arrow 101A of FIG. 1 and act 204 of FIG. 2), it may be a block of log records (such as block 400) that is written to the persistent log. Thus, the primary compute system 110 may wait for some number of log records to be generated before writing the log records as a block to the persistent log 131.

Returning to FIG. 1, the environment 100 also include a log service computing system 132. The log service computing system 132 may be a physical computing system, such as the computing system 1000 described below with respect to FIG. 10. Alternatively, or in addition, the log service computing system 132 may be a virtual machine, or perhaps may be an executable component, such as the executable component 1006 described below with respect to FIG. 10. The log service computing system 132 helps write operations that are performed and logged by the primary computing system 110 to be propagated to the appropriate storage segment server 140, and to the secondary compute system(s) 120 if there are any secondary compute systems.

The environment 100 also includes multiple storage segment servers 140. The data operated upon by the application 110A on the primary compute system 110 is spread across the storage segment servers 140. Each storage segment server is thus for servicing (e.g., storing) storage segments corresponding to only a portion of the user data. Storage segments may, for instance, be pages of data. Each page of data may include multiple blocks.

For instance, as represented by arrow 161, storage segment server 141 performs data operations for only the assigned storage segment set 151. Furthermore, arrow 162 represents that storage segment server 142 performs data operations only for its assigned storage segment set 152, arrow 163 represents that storage segment server 143 performs data operations for only its assigned storage segment set 153, and arrow 164 represents that storage segment server 144 performs data operations for only its assigned the storage segment set 154. The ellipses 145 and 155 represent that the principles described herein are not limited to the number of storage segment servers.

However, identifying which storage segment server is assigned to perform data operations for a given storage segment is simpler if the storage segments (e.g., pages) assigned to any given storage segment are contiguous within the address space of the user data. Furthermore, read operations on continuous storage segments may be more efficiently performed since a single read operation may be issued to return potentially many contiguous storage segments. In one embodiment, the user data is represented within a storage service 170 that underlies the storage segment servers 140. The user data distributed across the storage segment servers 140 may maintain the same layout and structure as the user data on the storage service 170.

The storage segment sets 151 through 155 are illustrated collectively as storage segment sets 150. When the storage segment servers 140 store their respective data using the storage service 170 offered by a cloud computing environment, the need to perform size of data operations is eliminated. For instance, such size of data operations may be the performance of a full backup of the entirety of the data. Conventionally, the primary compute system and each of the secondary compute systems would have to perform a full backup separately, by transferring data over a network. Thus, the principles described herein allow for excellent capability to scale the data upwards. However, a copy of the storage segment sets 151 through 155 may also be kept in a cache at each of the respective page servers 141 through 145. This allows for rapid access to the storage segments. But if the storage segment is lost in the cache of the page servers 140 (or even if one of the storage segment servers itself goes down), the storage segment is still available in the storage service 170 in the cloud computing environment.

The volume 135 may be mounted to multiple computing systems. For instance, that single mounted volume 135 may be included within a drive that is mounted to the primary compute system 110 as a read and write volume, while being mounted to the secondary compute system(s) 120 as a read-only volume. Since there is only one computing system mounted to that volume as a write volume, multiple computing systems may be mounted to the volume 135 without risk of corruption of data due to competing or inconsistent write operations. This may be accomplished if there is only a fixed-sized portion of the log within the volume 135, since even the management data of the volume would not be changed. The volume 135 might be within a cloud computing environment as part of a cloud store service. For instance, rather than read log records from the broker 133, the storage segment servers 140 and/or the secondary compute systems may read log records directly from the persistent log 131.

Figure 5:
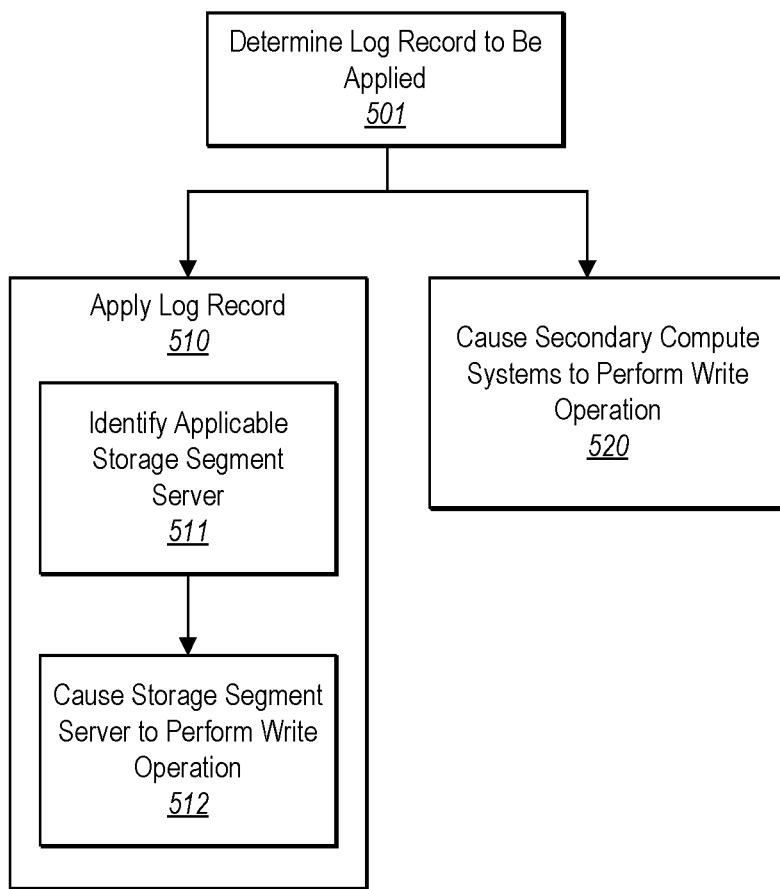
FIG. 5 illustrates a flowchart of a method for applying a log record to storage segments.

FIG. 5 illustrates a flowchart of a method 500 for applying a log record to storage segments in accordance with the principles described herein. The method 500 may be performed for each of multiple log records that are identified as to be applied. Thus, the performance of method 500 many times allows the log to be applied to appropriate storage segments. That is, the write operations specified in the log records are applied to the storage segments within the appropriate storage segment servers. As an example, the method 500 may be performed by the log service computing system 132 of FIG. 1. The method 500 may be performed within the environment 100 of FIG. 1, in order to apply the log record 300 of FIG. 3. Accordingly, FIG. 5 will now be described with respect to the FIGS. 1 and 3.

The method 500 is initiated upon determining that a particular log record is to be applied (act 501). For instance, that particular log record may be the log record 300 of FIG. 3. In response to identifying that the particular log record is to be applied (act 501), the particular log record is applied (act 510). This may be done with respect to the particular storage segment server that corresponds to the storage segment. This may also be done with respect to each secondary compute system.

Accordingly, the applying of the log record (act 510) includes identifying a particular storage segment server that is assigned to a particular set of storage segments that includes the particular storage segment to be written to in the particular write operation (act 511). In the case in which the set of storage segments are contiguous in an address space, the assignment of the set of storage segments to each storage segment server may be made to align with the most significant bits of the storage segment identifier. For instance, suppose that the storage segment identifiers range from binary 00000,00000 (comma added every five bits to assist the reader) to binary 01101,01111. In that case, there might be seven storage segment servers, one for storage segments having identifiers with the four most significant bits being 0000, another for the storage segments having identifiers with the four most significant four bits being 0001, and so on, until the seventh storage segment for storage segments having identifiers with the four most significant bits being 0110. Thus, determining which storage segment server is assigned to store a particular storage segment becomes an efficient computation. The log service computing system 132 may thus determine the appropriate storage segment server for the log record 300 based on the storage segment identifier 303.

Then, the particular storage segment server is caused to perform the particular write operation to the particular storage segment designated in the particular log record (act 512). For instance, the log service computing system 132 may provide (e.g., as represented by arrow 103B) the log record 300 to the appropriate storage segment server (say storage segment server 142). This would represent the completion of the write operation that began when the primary compute system 110 read (as represented by the arrow 102) that storage segment from the storage segment server.

In one example, this notification (represented by arrow 103B) is not pushed to the appropriate storage segment server. Instead, it is up to the storage segment server to make inquiry of the log service computing system 132 for the appropriate log records. Thus, the providing of the appropriate log record to the storage segment server may be in response to the request from the particular storage segment server. Thus, the storage segment server 143 assigned to the storage segment written to may be notified of the write operation after the storage segment server 143 asks for applicable log entries (as represented by arrow 103A).

The log service computing system 132 may have a broker component 133 thereon that handles processing of incoming requests for log records. The broker 133 may be an executable component on the log service computing system. For instance, the broker 133 may be structured as described below for the executable component 1006 of FIG. 10.

The broker 133 may provide log records not one at a time, but perhaps one block at a time. For instance, if the broker 133 determines that there are many log records (e.g., any of log records 401, 402, 403, 404 or 405) within a block of log records (e.g., block 400) that have a storage segment identifier within the set of storage segments assigned to a particular storage segment server, the broker 133 may send the entire block to the particular storage segment server.

In addition, the broker 133 may ensure that the log record is not communicated to any entity until the log service computing system 132 has been notified that the log record has been securely written into the persistent log 131 (i.e., the log record has become public). This helps the recovery process be consistent. During recovery, the recovery uses the persistent log 131 to determine what operations have been completed. If other components in the system (e.g., a secondary compute system or a storage segment server) has performed operations that the persistent log 131 is not aware of, then the recovery will fail to achieve a reliable state. The user data then becomes ambiguous, and thus corrupt.

The broker 133 may also perform other tasks. For instance, the broker 133 may expect that the primary compute system 110 (which is the source of the generated log records) is unreliable. In order to compensate for that, the broker 133 may implement different policies for deduplicating log records that have been received multiple times from the primary compute system 110. The broker 133 may perform this deduplication by keeping track of the primary compute system generations and by retaining only the latest generation for all log records. The broker 133 may also expect log records to get lost and compensates for that by filling in log records that were missed described below.

Returning to the method 500 of FIG. 5, the log service computing system also causes a secondary compute system to perform the particular write operation on a copy of the storage segment at the secondary compute system (act 520). This may also be performed by communicating (as represented by arrows 104B and 105B in FIG. 1) the log record (e.g., log record 300) to each secondary compute systems 121 and 122. While the log record may be pushed to the secondary compute systems 120, the broker 133 may likewise handle requests for log records (as represented by arrows 104A and 105A) from the secondary compute systems 120. Again, the log records may be provided as a block. As a reminder, the broker 133 may ensure that log records are not communicated to the secondary compute systems 120 unless the log record is already confirmed as written to the persistent log 131. As one possible optimization, the secondary compute system may also perhaps ignore the log record if it is for writing to a storage segment that is not already cached (and thus would cause a read from a storage segment server). In that case, if the secondary compute system was to use that storage segment later, the secondary compute node may read that storage segment from the storage segment server (which already has the write of the skipped log record applied).

Figure 6:
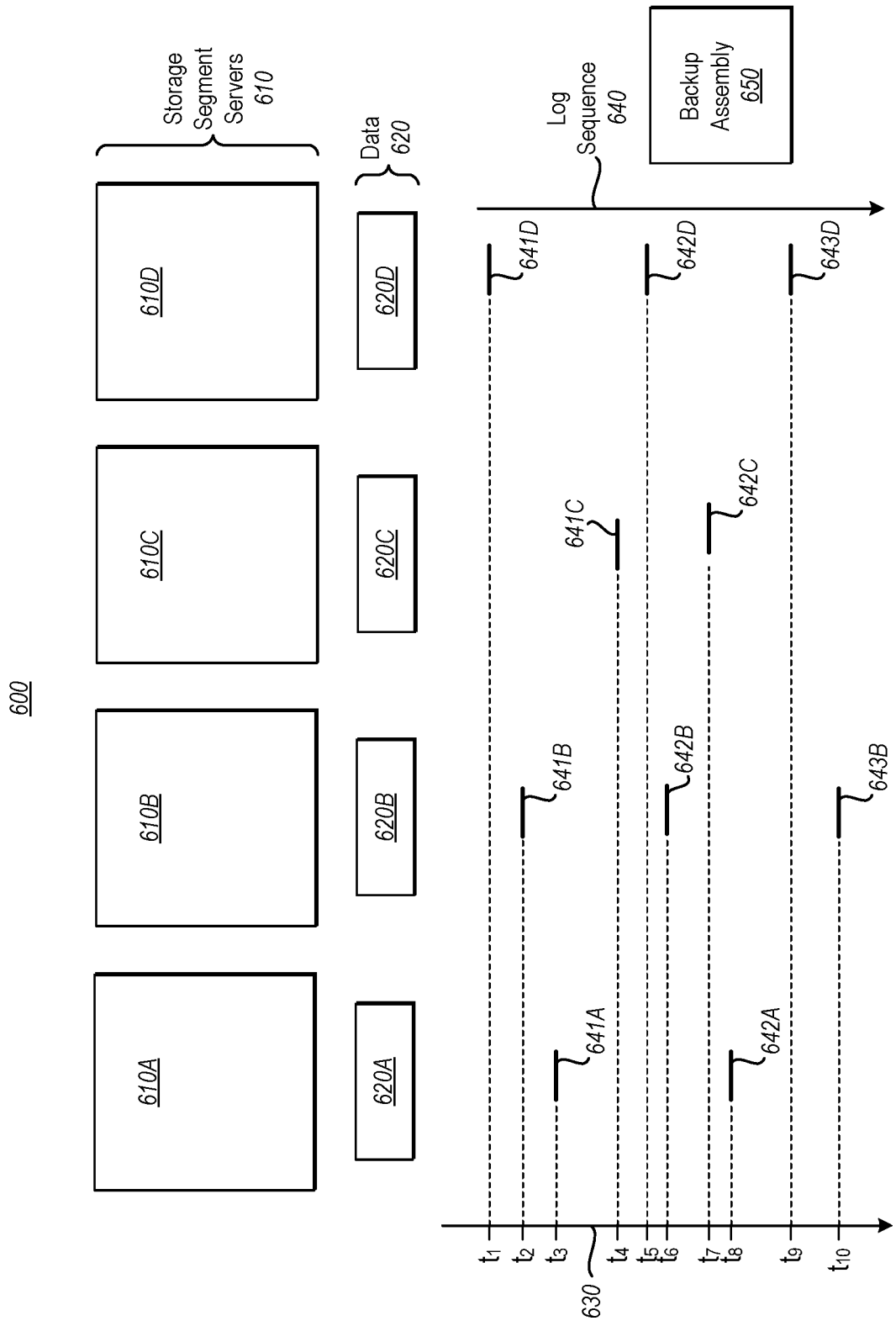
FIG. 6 illustrates an environment in which there are storage segment servers that collective store data, and in which the data portions held by each storage segment server are independently snapshotted.

FIG. 6 illustrates an environment 600 in which there are storage segment servers 610 that collective store data 620. The storage segment servers 610 are illustrated as including four storage segment servers 610A through 610D, which represent examples of the storage segment servers 141 through 144, respectively, of FIG. 1.

Each of the storage segment server 610 stores only a portion of the data 620. For instance, storage segment server 610A stores data portion 620A, storage segment server 610B stores data portion 620B, storage segment 610C stores data portion 620C, and storage segment 610D stores data portion 620D. In one embodiment, each of the data portions 620A through 620D internally store in contiguous addresses of an address space. Thus, the more leftward the position of a storage location within the data portion 620A, the lower the address within the address space. The same would be true of the other data portions 620B, 620C and 620D as well. Furthermore, when put together, the data portions 620A through 620D are also contiguous within that address space. Thus, data portion 620A has lower addresses than data portion 620B, which has lower addresses than data portion 620C, which has lower addresses than data portion 620D.

Each of the storage segment servers take snapshots of their respective data portions. For instance, in the example of FIG. 6, time is represented by arrow 630. The log sequence is also shown and is represented by arrow 640. The greater the log sequence number of a log record in the log sequence, the more recent was the operation represented by the log record performed.

In this particular example, storage segment server 610A took snapshot 641A of data portion 620A at time $t_3$, and snapshot 642A of data portion 620A at time $t_8$. Storage segment server 610B took snapshot 641B of data portion 620B at time $t_2$, snapshot 642B of data portion 620B at time $t_6$, and snapshot 643B of data portion 620B at time $t_{10}$. Storage segment server 610C took snapshot 641C of data portion 620C at time $t_4$, and snapshot 642C of data portion 620C at time $t_7$. Storage segment server 610D took snapshot 641D of data portion 620D at time $t_1$, snapshot 642D of data portion 620D at time $t_5$, and snapshot 643D of data portion 620D at time $t_9$.

In this example, the snapshot time of each of the storage segment servers is independent of the other storage segment servers. Although not required, not even a single snapshot occurred at the same time in the example of FIG. 6. Each of the snapshots was taken as of their own distinct time t1 through t10. More broadly stated, each of at least some of the storage segment servers take snapshots at a time that is independent of the other storage segment servers. This means that the storage segment servers do not need to coordinate snapshot times with other storage segment servers, thereby making the snapshot process more resilient.

FIG. 6 also illustrates a backup assembly computing system 650. The backup assembly computing system 650 may be a physical computing system, such as the computing system 1000 described below with respect to FIG. 10. Alternatively, or in addition, the backup assembly computing system 650 may be a virtual machine, or perhaps may be an executable component, such as the executable component 1006 described below with respect to FIG. 10.

Figure 7:
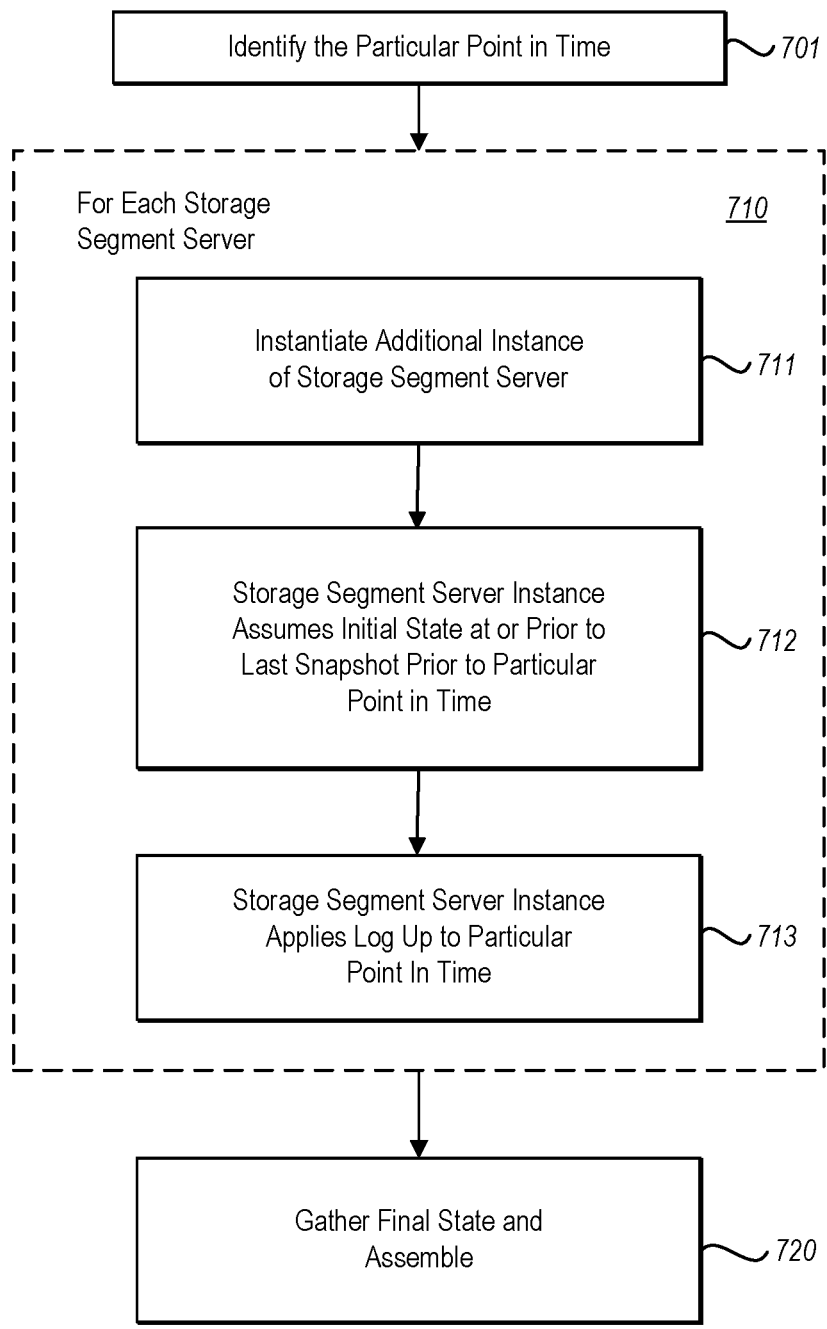
FIG. 7 illustrates a flowchart of a method for assembling a state of the user data as of a particular point in time in accordance with the principles described herein.

FIG. 7 illustrates a flowchart of a method 700 for assembling a state of the user data as of a particular point in time. As an example, the method 700 may be performed by the backup assembly computing system 650 of FIG. 6, in the context of the snapshots shown in FIG. 6. Accordingly, the method 700 will now be described with respect to FIG. 7 as well as with respect to FIG. 6 as an example only.

The method 700 may be performed for any arbitrary point in time. Accordingly, the method 700 begins by identify the particular point in time for which the state of the user data is desired (act 701). Then, there are acts that are performed for each of the storage segment servers. Those acts are contained within the dashed-lined box 710 of FIG. 7. For instance, the content of box 710 may be performed for each of the storage segment servers 610A through 610D with respect to their respective data portions 620A through 620D.

Specifically, an additional instance of the storage segment server is instantiated (act 711). For instance, an additional instance of the storage segment server 610A is instantiated, allowing the storage segment server 610A to continue operating as the additional instance works on formulating a prior state of the data portion 620A. Additionally, an additional instance of each of the storage segment servers 610B, 610C and 610D is instantiated, allowing the respective storage segment servers 610B, 610C and 610D to continue operating during the method 700 during which time the additional instances work on formulating a prior state of the respective data portions 620B, 620C and 620D. The backup assembly computing system 650 may cause these additional instantiations.

Then, the additional instance of the storage segment server is caused (e.g., at the instruction of the backup assembly computing system 650) to take an initial state (act 712). That initial state is the state that the data portion of the storage segment server had at or prior to a last snapshot. Then, the additional instance of the storage segment server is cause, beginning at this initial state, to apply log records that were applied by the respective storage segment server up to the particular point in time (act 713). This causes the additional instance of the storage segment server to arrive at a particular state of the respective data portion as it existed at the particular point in time.

Figure 8A:
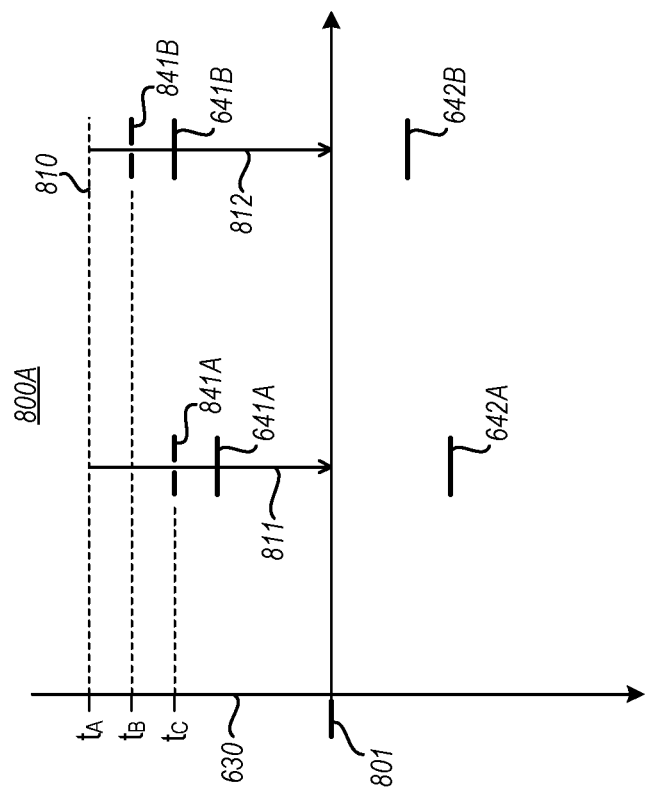
FIG. 8A shows a portion of the snapshot timeline of FIG. 6, in which the initial state of the additional instances of the storage segment servers is at a beginning of the oldest transaction that was active at any of the last snapshots for any of the data portions.
Figure 9B:
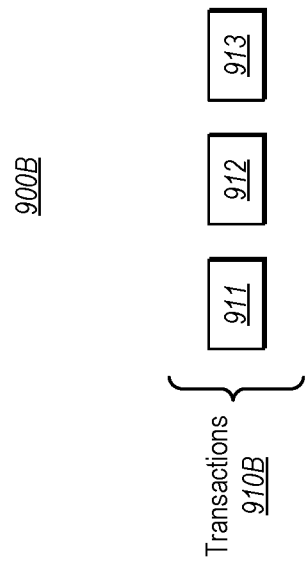
FIG. 9B illustrates a set of transactions that were active at the time of the last snapshots prior to the particular point in time for only one data portion.

For instance, FIG. 8A shows a portion 800A of the snapshot timeline of FIG. 6. However, only the snapshot timeline for data portion 620A and 620B are shown. Snapshots 641A and 642A of data portion 620A is shown. In addition, snapshots 641B and 642B of data portion 620B is shown. Suppose that the particular point in time for which the user data is desired is point 801. The last snapshot for data portion 620A prior to this particular point in time 801 is snapshot 641A. The last snapshot for data portion 620B prior to this particular point in time 801 is snapshot 641B.

In a non-transactional system, the additional instance of the storage segment server 610A could simply begin at the last snapshot 641A and apply all applicable log records in the log (e.g., persistent log 131) all the way up to the point in time 801. Likewise, the additional instance of the storage segment server 610B could simply begin at the last snapshot 641B and apply all applicable log records in the persistent log all the way up to the point in time 801.

However, in a transactional system, there is an accounting for all of the transactions that are active at the time of the snapshot. In FIG. 8A, suppose that line 810 represents the beginning time (i.e., time TA) of the oldest transaction that was still active at any of the last snapshots (prior to the particular instant in time) for any of the data portions. In that case, each snapshot would record all of the active transactions at the time of the snapshot.

Figure 9A:
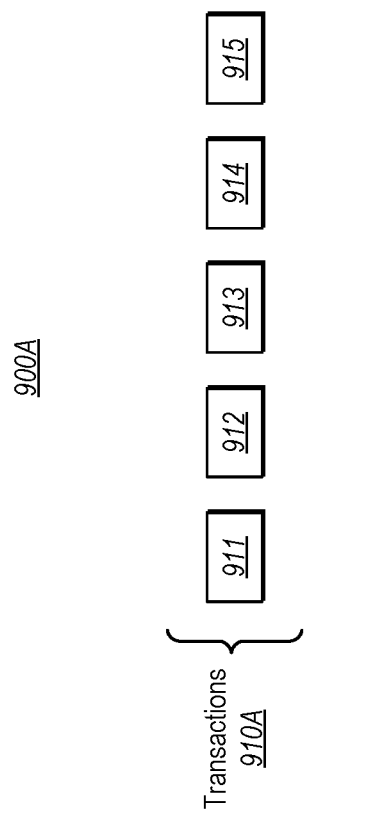
FIG. 9A illustrates a superset of transactions that were active at any the time of any of the last snapshots prior to the particular point in time for any of the data portions.

Suppose that, for snapshots of data portion 620A, at the time of the last snapshot 641A (prior to the particular point in time 801), three transactions 911, 912 and 913 were pending. The snapshot 641A would also identify the three active transactions 911, 912 and 913. Now suppose that at the time of the last snapshot 641B (prior to the particular point in time 801) of the data portion 620B, there were three transactions 912, 913 and 914 pending. The snapshot 641B would also identify the three active transactions. The last snapshots (prior to the particular point in time 801) would also have recorded the transactions that were still pending at the time of the respective snapshots. The superset of all of those active transactions (for all of the last snapshots for each data portion) would then be taken. For instance, FIG. 9A illustrates an example superset of transactions 910A as including five transactions 911 through 915. As an example, the beginning of the oldest transaction in this set is represented by line 810. This could be the time of the initial state assumed by all additional instances of the storage segment servers, and all of the instances apply applicable log records beginning at line 810 and proceeding through to the particular point in time 801. This is represented by arrow 811 for data portion 620A, and arrow 812 for data portion 620B.

Figure 8B:
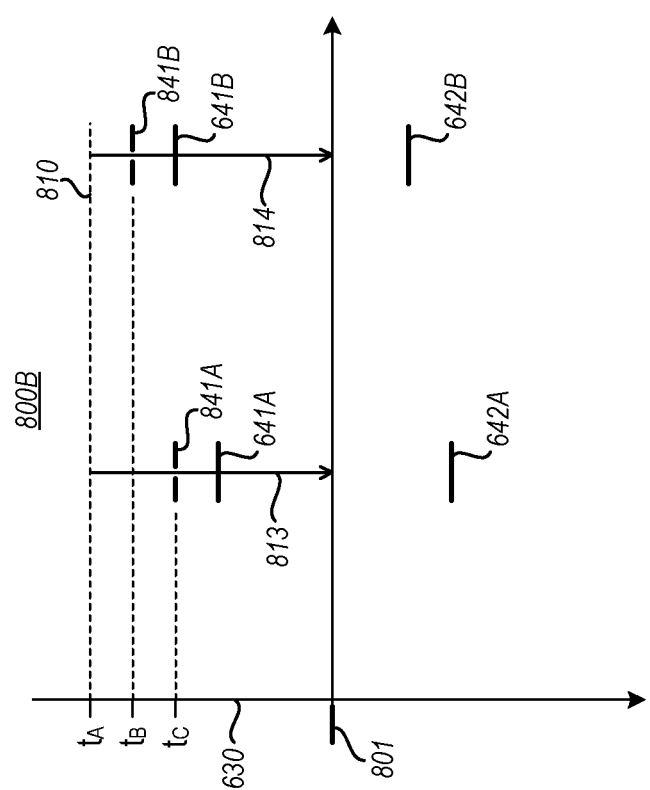
FIG. 8B shows a portion of the snapshot timeline of FIG. 6, in which the initial state of the additional instances of the storage segment servers is, for each data portion, at a beginning of the oldest transaction that was active at that last snapshot of that data portion, and which include operations applicable to the data portion.

Alternatively, the oldest transaction is evaluated independently for each data portion with the additional consideration of those transactions that impact the respective data portions (e.g., include operations that read from, or write to the data portion). For instance, referring to FIG. 9B, the snapshot 641A may include a recording of transactions 910B, which may include only transactions active at the time of the snapshot 641A and which impacted the data portion 620A. Referring to FIG. 8B, the beginning time $T_C$ of the oldest of such transactions is actually at line 841A. The initial state of the additional instance of the storage segment server 610A may begin at the state of the data portion 620A at time 841A, with applicable log entries being applied (as represented by arrow 813) to the particular point in time 801.

Similarly, for data portion 620B, the oldest of the transactions that were active at the time of the snapshot 641B, and which impact only the data portion 620B, begins at time $T_B$, as presented by line 841B. The initial state of the additional instance of the storage segment server 610B may begin at the state of the data portion 620B at time 841B, with applicable log entries being applied (as represented by arrow 814) to the particular point in time 801.

This process may be performed to obtain particular states of all (or at least some) of the respective portions of the user data. Returning to FIG. 7, these data portions having this particular state may then be gathered (act 720) to thereby assembly an at least partial (or complete) backup of the data as of the particular point in time. This was accomplished even without coordination of snapshots between the various storage server segments.

Because the principles described herein operate in the context of a computing system, a computing system will be described with respect to FIG. 10. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 10:
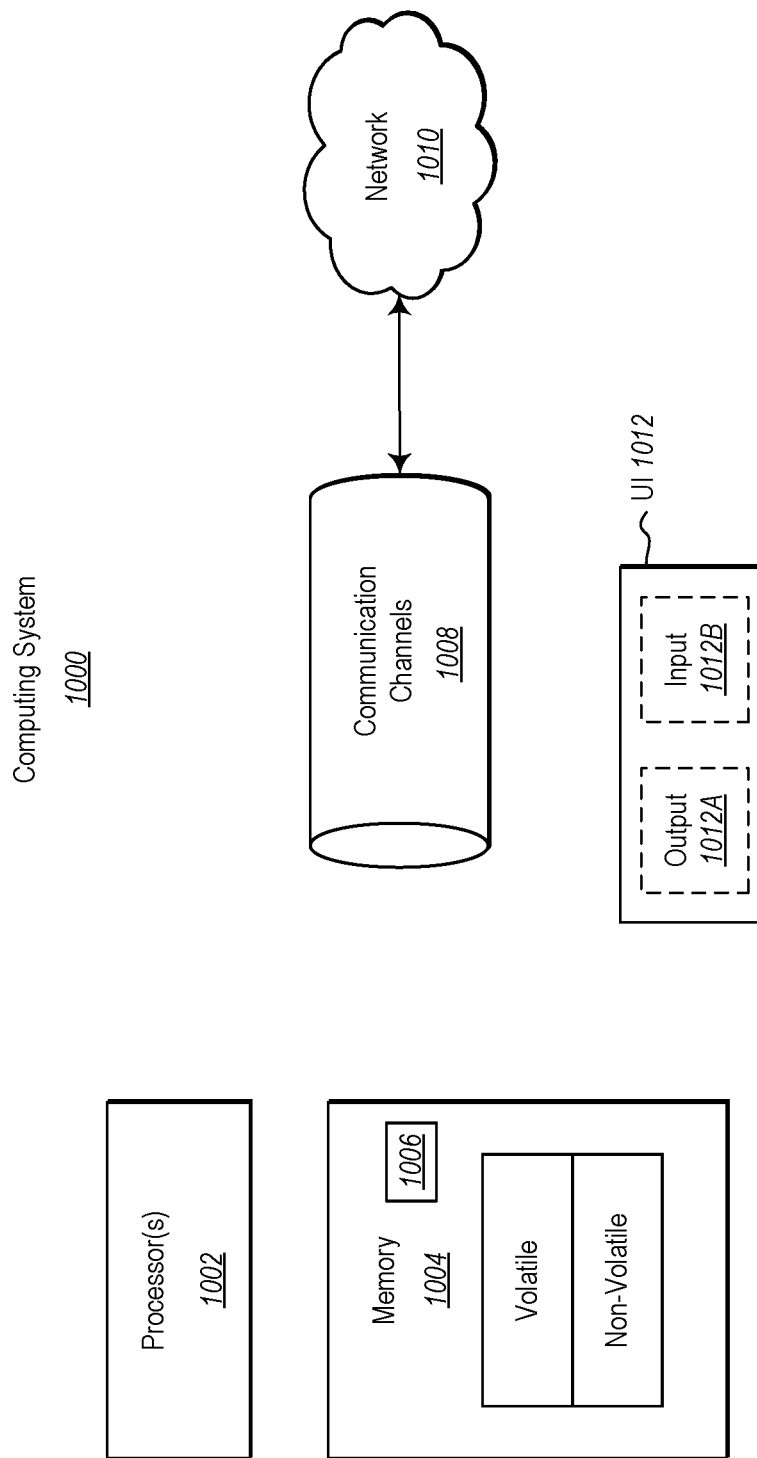
FIG. 10 illustrates an example computer system in which the principles described herein may be employed.

As illustrated in FIG. 10, in its most basic configuration, a computing system 1000 typically includes at least one hardware processing unit 1002 and memory 1004. The memory 1004 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1000 has thereon multiple structures often referred to as an "executable component". For instance, the memory 1004 of the computing system 1000 is illustrated as including executable component 1006. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 1004 of the computing system 1000. Computing system 1000 may also contain communication channels 1008 that allow the computing system 1000 to communicate with other computing systems over, for example, network 1010.

While not all computing systems require a user interface, in some embodiments, the computing system 1000 includes a user interface 1012 for use in interfacing with a user. The user interface 1012 may include output mechanisms 1012A as well as input mechanisms 1012B. The principles described herein are not limited to the precise output mechanisms 1012A or input mechanisms 1012B as such will depend on the nature of the device. However, output mechanisms 1012A might include, for instance, speakers, displays, tactile output, holograms, virtual reality, and so forth. Examples of input mechanisms 1012B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment that includes a plurality of storage segment servers collectively storing user data, each of the plurality of storage segment servers individually storing a portion of the user data, and each of the plurality of storage segment servers taking snapshots at independent times, a backup assembly computing system that comprises:
   one or more processors; and
   one or more computer-readable storage media having thereon computer-execution instructions that are executable by the one or more processors for configuring the computing system to assemble a state of the user data as of a particular point of time and by at least configuring the computer system to:
   identify the particular point in time; and
   for each of the plurality of storage segment servers, performing the following:
      instantiate an additional instance of the storage segment server;
      cause the additional instance of the storage segment server to take an initial state that the respective storage segment server had at or prior to a last snapshot of the respective portion of the user data stored by the respective storage segment server;
      cause the respective storage segment server to request, from a log service, one or more applicable log records specific to the respective storage segment server from a log that contains a plurality of log records, the plurality of log records including the one or more applicable log records specific to the respective storage segment server as well as log records that are not applicable to the respective storage segment server, but that are applicable to the other one or more storage segment servers;
      cause the respective storage segment server to receive the one or more applicable log records specific to the respective storage segment server without receiving the log records that are not applicable to the respective storage segment servers; and
      cause the additional instance of the storage segment server to, beginning at the initial state, apply only the one or more applicable log records specific to the storage segment server that were applied by the respective storage segment server up to the particular point in time to arrive at a particular state of the respective portion of the user data stored by the respective storage segment server as of the particular point in time.

2. The computing system in accordance with claim 1, wherein for at least one of the plurality of storage segment servers, the initial state that the respective storage segment server had is prior to the last snapshot of the respective portion and at or prior to the beginning of any transaction that was pending at the time of the last snapshot.

3. The computing system in accordance with claim 1, wherein for at least one of the plurality of storage segment servers, the initial state that the respective storage segment server had is prior to the last snapshot of the respective portion and at or prior to the beginning of any transaction that was pending at the time of the last snapshot and that changed data within the respective portion of the respective storage segment server.

4. The computing system in accordance with claim 3, the initial state being at a different log time for each of the additional instances of the plurality of storage segment servers.

5. The computing system in accordance with claim 3, wherein the at least one of the plurality of respective storage segment servers recorded the last snapshot along with a list of one or more transactions that were pending at the time of the last snapshot and that changed data within the respective portion of the respective storage segment server.

6. The computing system in accordance with claim 1, wherein for each of the plurality of storage segment servers, the initial state that the respective storage segment server had is at or prior to the beginning of any transaction that was pending at the time of the last snapshot.

7. The computing system in accordance with claim 1, wherein for each of the plurality of storage segment servers, the initial state that the respective storage segment server had is at or prior to the beginning of any transaction that was pending at the time of the last snapshot and that changed data within the respective portion of the respective storage segment server.

8. The computing system in accordance with claim 7, the initial state being at a different log time for each of the additional instances of the plurality of storage segment servers.

9. The computing system in accordance with claim 1, the computer executable instructions being further executable for configuring the computing system to:
   gather the particular state of the respective portion of the data from each of the additional instances of the plurality of storage segment servers to thereby assemble an at least partial backup of the data as of the particular point in time.

10. The computing system in accordance with claim 1, wherein the log records for each of the plurality of different storage segments are maintained in a single persistent log.

11. The computing system in accordance with claim 10, wherein the log records for each of the plurality of different storage segments contain segment identifiers used to determine whether a log record is an applicable log record that is being requested by the requesting storage segment server.

12. In a computing environment that includes a plurality of storage segment servers collectively storing user data, each of the plurality of storage segment servers individually storing a portion of the user data, and each of the plurality of storage segment servers taking snapshots at independent times, a method for assembling a state of the user data as of a particular point of time, the method comprising:
identifying the particular point in time; and
for each of the plurality of storage segment servers, performing the following:
instantiating an additional instance of the storage segment server;
causing the additional instance of the storage segment server to take an initial state that the respective storage segment server had at or prior to a last snapshot of the respective portion of the user data stored by the respective storage segment server;
causing the respective storage segment server to request, from a log service, one or more applicable log records specific to the respective storage segment server from a log that contains a plurality of log records, the plurality of log records including the one or more applicable log records specific to the respective storage segment server as well as log records that are not applicable to the respective storage segment server, but that are applicable to the other one or more storage segment servers;
causing the respective storage segment server to receive the one or more applicable log records specific to the respective storage segment server without receiving the log records that are not applicable to the respective storage segment servers; and
causing the additional instance of the storage segment server to, beginning at the initial state, apply only the one or more applicable log records specific to the storage segment server that were applied by the respective storage segment server up to the particular point in time to arrive at a particular state of the respective portion of the user data stored by the respective storage segment server as of the particular point in time.

13. The method in accordance with claim 12, wherein for at least one of the plurality of storage segment servers, the initial state that the respective storage segment server had is prior to the last snapshot of the respective portion and at or prior to the beginning of any transaction that was pending at the time of the last snapshot.

14. The method in accordance with claim 12, wherein for at least one of the plurality of storage segment servers, the initial state that the respective storage segment server had is prior to the last snapshot of the respective portion and at or prior to the beginning of any transaction that was pending at the time of the last snapshot and that changed data within the respective portion of the respective storage segment server.

15. The method in accordance with claim 14, the initial state being at a different log time for each of the additional instances of the plurality of storage segment servers.

16. The method in accordance with claim 12, wherein for each of the plurality of storage segment servers, the initial state that the respective storage segment server had is at or prior to the beginning of any transaction that was pending at the time of the last snapshot.

17. The method in accordance with claim 12, wherein for each of the plurality of storage segment servers, the initial state that the respective storage segment server had is at or prior to the beginning of any transaction that was pending at the time of the last snapshot and that changed data within the respective portion of the respective storage segment server.

18. The method in accordance with claim 17, the initial state being at a different log time for each of the additional instances of the plurality of storage segment servers.

19. The method in accordance with claim 12, the method further comprising:
gathering the particular state of the respective portion of the data from each of the additional instances of the plurality of storage segment servers to thereby assemble an at least partial backup of the data as of the particular point in time.

20. A computer program product comprising one or more computer-readable storage media that does not include transmission media and that has stored thereon computer-executable instructions that are executable by the one or more processors to configure the computing system to assemble a state of the user data as of a particular point of time in a computing environment that includes a plurality of storage segment servers collectively storing user data, each of the plurality of storage segment servers individually storing a portion of the user data, and each of the plurality of storage segment servers taking snapshots at independent times, and by at least configuring the computing system to:
identify the particular point in time; and
for each of the plurality of storage segment servers, to:
instantiate an additional instance of the storage segment server;
cause the additional instance of the storage segment server to take an initial state that the respective storage segment server had at or prior to a last snapshot of the respective portion of the user data stored by the respective storage segment server;
cause the respective storage segment server to request, from a log service, one or more applicable log records specific to the respective storage segment server from a log that contains a plurality of log records, the plurality of log records including the one or more applicable log records specific to the respective storage segment server as well as log records that are not applicable to the respective storage segment server, but that are applicable to the other one or more storage segment servers;
cause the respective storage segment server to receive the one or more applicable log records specific to the respective storage segment server without receiving the log records that are not applicable to the respective storage segment servers; and
cause the additional instance of the storage segment server to, beginning at the initial state, apply only the one or more applicable log records specific to the respective storage segment server that were applied by the respective storage segment server up to the particular point in time to arrive at a particular state of the respective portion of the user data stored by the respective storage segment server as of the particular point in time.

* * * * *